(12) United States Patent
Wang et al.

(10) Patent No.: US 8,386,943 B2
(45) Date of Patent: Feb. 26, 2013

(54) METHOD FOR QUERY BASED ON LAYOUT INFORMATION

(75) Inventors: Donglin Wang, Beijing (CN); Ningsheng Liu, Beijing (CN); Ruihua Wang, Beijing (CN)

(73) Assignee: Sursen Corp., Beijing (CN)

( * ) Notice: Subject to any disclaimer, the term of this patent is extended or adjusted under 35 U.S.C. 154(b) by 217 days.

(21) Appl. No.: 12/537,746

(22) Filed: Aug. 7, 2009

(65) Prior Publication Data
US 2010/0287187 A1    Nov. 11, 2010

Related U.S. Application Data

(63) Continuation-in-part of application No. PCT/CN2008/070247, filed on Feb. 2, 2008.

(30) Foreign Application Priority Data
Feb. 14, 2007    (CN) .......................... 2007 1 0063928

(51) Int. Cl.
G06F 3/00    (2006.01)
G06F 7/00    (2006.01)

(52) U.S. Cl. ........................ 715/764; 707/729
(58) Field of Classification Search .................... 707/769
See application file for complete search history.

(56) References Cited

U.S. PATENT DOCUMENTS

| | | | |
|---|---|---|---|
| 6,199,046 B1 * | 3/2001 | Heinzle et al. .................... 705/39 |
| 6,691,126 B1 * | 2/2004 | Syeda-Mahmood ......... 707/696 |
| 7,646,230 B2 * | 1/2010 | Parfitt ............................ 327/265 |
| 7,664,738 B2 * | 2/2010 | Sohma ........................... 707/769 |
| 7,823,066 B1 * | 10/2010 | Kuramura ..................... 715/717 |
| 2003/0026476 A1 * | 2/2003 | Shiiyama ....................... 382/165 |
| 2003/0234766 A1 * | 12/2003 | Hildebrand .................... 345/168 |
| 2006/0174209 A1 * | 8/2006 | Barros ............................ 715/764 |
| 2007/0055691 A1 * | 3/2007 | Statchuk ........................ 707/102 |
| 2007/0094698 A1 * | 4/2007 | Bountour et al. .............. 725/132 |
| 2007/0260575 A1 * | 11/2007 | Robinson et al. .................. 707/1 |
| 2008/0045804 A1 * | 2/2008 | Williams ........................ 600/300 |
| 2010/0069035 A1 * | 3/2010 | Johnson ..................... 455/404.1 |
| 2010/0232661 A1 * | 9/2010 | Hisanaga et al. .............. 382/128 |
| 2010/0268733 A1 * | 10/2010 | Hayaishi et al. ............... 707/769 |
| 2010/0274804 A1 * | 10/2010 | Muskal et al. ................. 707/769 |

FOREIGN PATENT DOCUMENTS

| | | |
|---|---|---|
| CN | 1268710 | 10/2000 |
| CN | 1430752 | 7/2003 |
| CN | 1534521 | 10/2004 |
| CN | 1632821 | 6/2005 |

* cited by examiner

*Primary Examiner* — Don Wong
*Assistant Examiner* — Mohammad Kabir
(74) *Attorney, Agent, or Firm* — David Xue; Goodwin Procter LLP

(57) ABSTRACT

The present invention discloses a method for query based on layout information, including: setting up a query condition containing layout information; and querying an electronic document based on the query condition containing the layout information. The present invention also discloses a device corresponding to the method.

14 Claims, 6 Drawing Sheets

__ __

METHOD FOR QUERY BASED ON LAYOUT INFORMATION

CROSS-REFERENCE TO RELATED APPLICATIONS

This application is a continuation-in-part of PCT/CN2008/070247, filed Feb. 2, 2008, which is a PCT filing of Chinese application no. 100710063928.4 filed Feb. 14, 2007, which applications are fully incorporated herein by reference.

FIELD OF THE INVENTION

The present invention relates to query technologies, and particularly to a method for query based on layout information.

BACKGROUND OF THE INVENTION

Along with the widespread utilization of computer technology, the practice of saving information in electronic documents is gradually taking the place of conventional information storage method. The methods for querying in electronic documents at present mainly include text query based on character matching. However, in practice, a great amount of useless texts besides wanted texts would be presented by using conventional methods for query since the inputted query conditions are usually not precise enough. Users generally need to manually filter the query results, which means the query results are not precise. In addition, the information saved in electronic documents includes not only texts, but also varieties of graphics, images, even media information; while the conventional methods for query are able to handle texts only. Though a few methods for query of graphics and images are available now, those methods for query are only capable of detecting the presence of images and locating the images, and cannot be used for query of specific targets based on the query conditions given by the user.

It can be seen that conventional methods for character-based electronic document query are unable to satisfy the demands for full-scale, highly efficient and accurate queries.

SUMMARY OF THE INVENTION

The present invention provides a method for query based on layout information, including:

setting up a query condition containing layout information which is a visible attribute of an object; and querying an electronic document based on the query condition containing the layout information.

Setting up the query condition containing layout information includes: including a description of characteristics of any one or any combination of text layout information, graphic layout information, image layout information and public layout information into the query condition.

When the query condition is a description of characteristics of text layout information, setting up the query condition containing the layout information comprises: including a description of characteristics of at least one of character font, character size, text color, text filling style, text outline style and special effect of character in the query condition.

When the query condition is a description of characteristics of graphic layout information, setting up the query condition containing the layout information comprises: including in the query condition a description of at least one of graphic shape, graphic size, graphic filling style and graphic outline style.

When the query condition is a description of characteristics of image layout information, setting up the query condition containing the layout information comprises: including in the query condition a description of at least one of image shape, image size, image color and image format.

When the query condition is a description of characteristics of public layout information, setting up the query condition containing the layout information further comprises: including a description of characteristics of at least one of object position and object coordinate conversion in the query condition.

The method may further includes: setting up in advance a relation between the query condition containing the layout information and a query rule; wherein querying in an electronic document based on the query condition containing the layout information comprises: acquiring the query rule from the relation based on the query condition containing the layout information; and querying in the electronic document based on the query condition containing the layout information and the query rule.

Setting up the query condition containing the layout information comprises: inputting layout information by a user as the query condition containing the layout information; or selecting at least one attribute of layout information by the user from layout information provided by a query system as the query condition containing layout information.

The electronic document in the preceding technical scheme is a document conforming to a docbase standard.

The docbase standard includes an Unstructured Operation Markup Language standard.

The present invention also provides a device for query based on layout information, including: a condition setup unit, adapted to set up a query condition containing layout information which is a visible attribute of an object; and an execution unit, adapted to query in an electronic document based on the query condition containing the layout information.

The execution unit includes: a rule acquiring module, adapted to acquire a query rule based on the query condition containing the layout information; and an execution module, adapted to query in the electronic document based on the query condition containing layout information and the query rule from the rule acquiring module.

It can be seen from the preceding technical schemes that, unlike the prior art, the method for query based on layout information of the present invention adopts single or combined attributes of layout information as the query conditions and produces query results from the queried electronic documents based on the query conditions. Since the layout information adopted as the query conditions includes text layout information, graphic layout information, image layout information and public layout information, the present invention can employ query conditions which contain more diversified layout information than the prior art, therefore the present invention can be more particular with query target, produce more precise query result and improve the query efficiency. In addition, the present invention allows querying for specific graphics and images based on the layout information inputted by the user and hence widens the range of objects that can be queried.

DETAILED DESCRIPTION OF THE INVENTION

A detailed description of embodiments of the present invention is provided hereinafter with reference to the accompanying drawings.

Layout information is a description of visible contents of an electronic document, including the description of visible attributes of all objects presented on a layout. The objects on a layout usually include texts, graphics and images; and visible attributes of these objects usually include font and position of the texts, resolution and color of the images, line width and position of the graphics, etc. The objects of each category are given multiple attributes of layout information describing visible attributes of the objects. Different objects may have different layout information describing respective visible attributes of the objects.

The core idea of the embodiments of the present invention is: setting up query conditions which contain layout information by a user, and querying in an electronic document to be queried based on the query conditions, so as to provide a full-scale, highly efficient and accurate method for query.

Said electronic document includes document information stored in electronic/digital ways, which may be as individual files, e.g., common electronic office documents and web pages, or as databases that store document information as structured data or as docbases that store document information as unstructured data, e.g., docbases that stores one or more document files based on the Unstructured Operation Markup Language (UOML) standard. According to the conventional art, querying technology developers are usually incapable of fully parsing electronic document formats and can only extract text information and query in the text information, but can not carry out complicated querying based on other layout information such as graphics and images. The docbase technology provides standard interfaces through which layout information can be easily extracted from electronic documents, therefore it is now possible to query based on various complicated layout information.

The objects that can be queried in an electronic document include all information saved in electronic formats, such as texts, graphics and images. The layout information adopted as the query conditions may contain any or any combination of text layout information, graphic layout information, image layout information and public layout information. Each of the layout information types may further include one or more than one item of visible attribution description.

Figure 1:
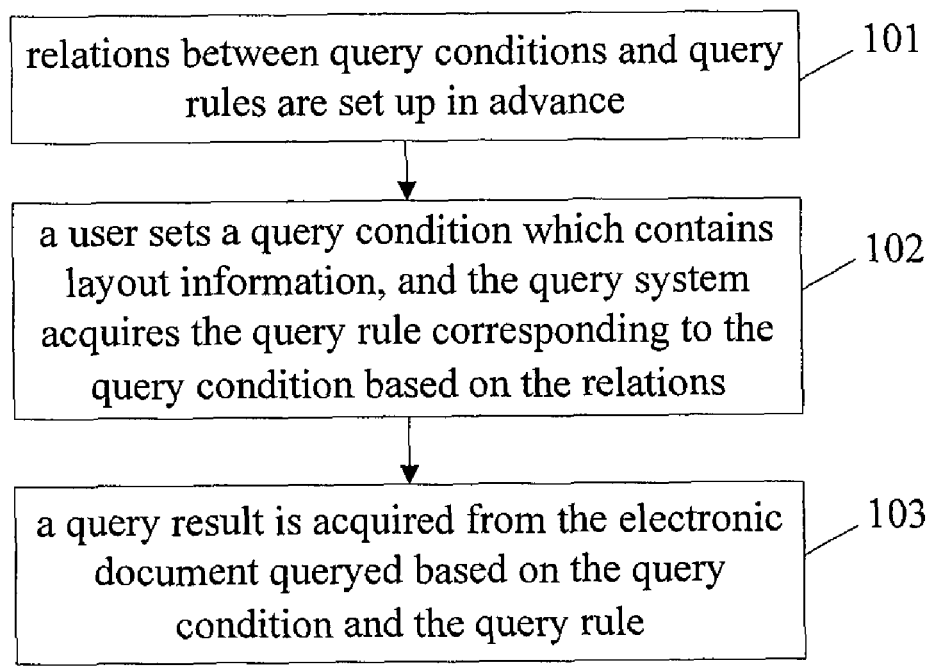
FIG. 1 is a flow chart illustrating a method for query based on layout information in accordance with an embodiment of the present invention.

FIG. 1 is a flow chart illustrating a method for query based on layout information in accordance with an embodiment of the present invention. As shown in FIG. 1, the method includes the steps as follows.

In step 101, relations between query conditions and query rules are set up in advance in a query system.

In step 102, a user sets up a query condition which contains layout information, and the query system acquires the query rule corresponding to the query condition based on the relations.

In this step, a user may set up the layout information as the query condition by inputting the layout information or choosing one or more than one attribute of layout information as the query condition from layout information options provided by the query system. The query system can list all layout information, or list only layout information related to the electronic documents to be queried by the user.

In step 103, a query result is acquired from the queried electronic document based on the query condition and the query rule.

The query condition may contain a description of the characteristics of the target object to be queried for, e.g., the query condition can be a 15-pound-weighted word "intellectual property", or the word "intellectual property" with heaviest weight. And the query rule may include an algorithm used for querying for the target object that meets the query condition. The query is conducted mainly by matching. Objects in an electronic document, including text, graphics and images, are saved in form of different data fields of the electronic document. In this embodiment, the query rule includes querying in an electronic document for data fields that meet the query condition based on the layout information, and taking the objects described by the data fields found as the result of a successful matching, i.e., the query result. For example, when querying for 15 pound-weighted word "intellectual property", the query rule shall include: querying in the character code field of each text object to verify whether the character code corresponds to the word "intellectual" and querying for the character size field of the text object to verify whether the character size is 15 pounds; if the character code corresponds to the word "intellectual" and the character size is 15 pounds, moving on to query in the character code field and the character size field of the next text object and to verify whether character code of this next text object corresponds to the word "property" and whether the character size is 15 pounds; if the verification result are positive again, regarding the two objects combined as a successful match and adding the two objects into the query result.

When the electronic document complies with a docbase standard (i.e., accessible via a docbase standard interface), the following query rule may be applied: enumerating each object in the electronic document via the standard docbase interface, determining whether the object matches the query condition, and adding the object into the query result if the object successfully matches the query condition.

Since an electronic document mainly contains text, graphic and image objects, a number of embodiments in which different query targets, which may be text object, graphic object or image object, are used will be given below to further illustrate the method for query based on layout information. It should be noted that the relations between the query conditions and the query rules are set up in advance, thus the description of the step of setting up the relations will be omitted in the embodiments.

Embodiment 1

In this embodiment, the query target is text, i.e., text query is conducted based on text layout information.

The query based on text layout description information commonly adopts at least one of character size, font, color, filling style, outline style and special effects as the query condition. Detailed description of these query conditions is provided hereinafter.

Font condition: may contain the specified name of the font or the name of the font category, e.g., SimFang. The font category Arial may further include the font Fangzheng SimFang, Huawen SimFang, Wenxing SimFang, etc. And the query rule may include querying in the electronic document to be queried for characters whose font matches the font set by the user.

Character size condition: may contain a specific value, or a range, or a description of character size. When the character size condition contains a specific size or a size range, the query will be a precise query and the query rule may include querying in the electronic document for characters matching the specific size or size range set by the user. When the character size condition contains a description of character size, the query shall be a fuzzy query. For example, the description of the character size is "the largest character size", the query rule shall include identifying the largest character size applied to the text in the electronic document, adopting that size as the query condition in querying in the electronic document and regarding the characters successfully matches the query condition as the query result.

3. Text color condition: may contain a foreground and/or background color, which may be expressed as a specific color code or a color code range. The query rule shall include querying the electronic document for characters in a color matching the color code or color code range set by the user.

4. Text filling style condition: may contain filling color, filling pattern and filling algorithm.

4a) Filling color condition: may contain the color of the whole text or the color of a part of the text. When the query condition contains the color of the whole text, the query rule shall include querying the electronic document for text filled with a color whose color code matches the color code set by the user. When the query condition contains the color of a part of the text, the query rule shall include querying the electronic document for text whose most part is in a color that has a color code matching the color code set by the user. The filling color may also include a graphical special effect and the query rule shall include querying for text whose filling color adopts a special effect algorithm matching the special effect algorithm set by the user.

4b) Filling pattern condition: whose corresponding query rule shall include querying for text adopting a filling pattern that matches the pattern template set by the user. The pattern template can be provided by the query system and chosen by the user.

4c) Filling algorithm condition: whose corresponding query rule shall include querying in the electronic document for text adopting a filling algorithm matching the filling algorithm set by the user. The query system can list a number of common filling algorithms for the user to choose from.

5. Text outline style condition: may contain color, line style and line width of text outline.

5a) Outline color condition: may be a specific RGB (Red Green Blue) value, or a RGB value range, or a description of color. In a precise query, e.g., based on specified RGB value or a RGB value range, the query rule shall include a matching step; in a fuzzy query based on a description of color, e.g., "red", the query rule shall include converting the description of color into an RGB color value or an RGB color range and then conducting matching.

5b) Outline pattern condition: may contain dotted line, solid line or no outline. The query rule shall include a matching step.

5c) Outline width condition: contain a specific value, or a value range, or a description of line width, e.g., the widest line, the thinnest line, etc. In a precise query based on a specific line width value or a width value range, the query shall be conducted by matching. The fuzzy query based on a description of the line width is similar to the fuzzy query based on character size.

6. Special effect condition: may contain effects shown while displaying text, and mainly contains bold, italic, underlined, stroke-through, embossed, engraved, superscript, subscript, shadowed, hidden, etc.

The preceding text layout information can be provided by the query system through a page for the user to choose from, or be inputted manually by the user. Each type of text layout information can be used separately or in combination with other text layout information as the query condition. When the query condition contains a combination of different types of text layout information, text layout information of each type in the combination may include one or multiple attributes of text layout information. The text layout information described above can be adopted as the query condition or be combined with characters as the query condition so as to increase the query accuracy. For example, the query condition can be the word "intellectual property" weighted 3 pounds and in red, or the word "intellectual property" weighted 3-18 pounds and in red, or the word "intellectual property" of the heaviest weight in bold.

In this embodiment, the conventional character matching is adopted as basic querying means and the query based on layout information is adopted as auxiliary querying means. The layout information including character font, character size, text color and character outline color is considered as a combined query condition. Sometimes a user pays no attention to a character itself, but to the combination of varieties of layout information, e.g., an artistic effect consisting of a particular character font, character size, text color and outline color. In such situation any of the layout information can be adopted as the basic query condition for the query.

Figure 2:
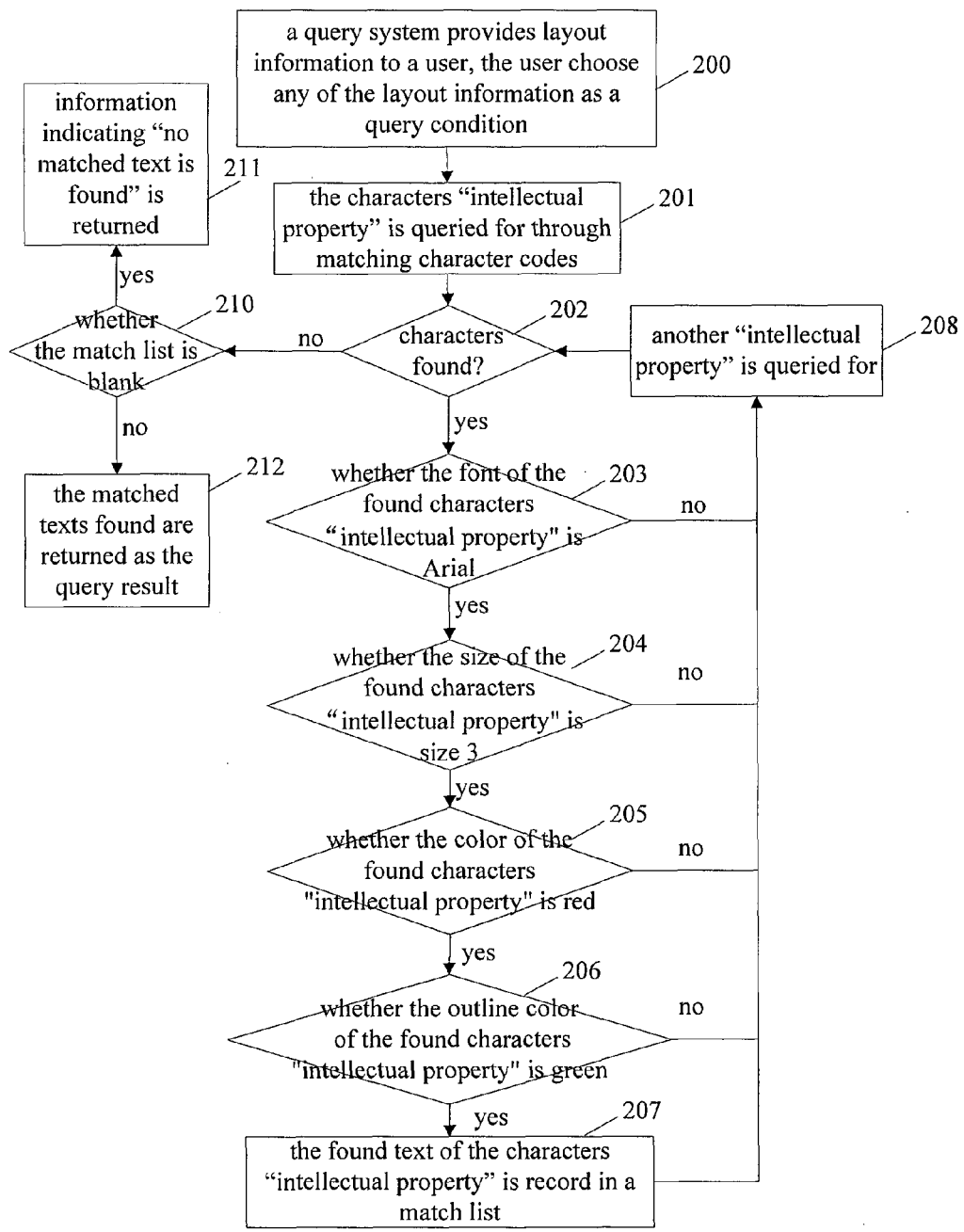
FIG. 2 is a flow chart illustrating a method for querying texts based on layout information in accordance with Embodiment 1 of the present invention.

FIG. 2 is a flow chart of a method adapted for querying for texts based on layout information in accordance with Embodiment 1 of the present invention. As shown in FIG. 2, the method comprises steps as follows.

In step 200, a query system analyzes layout information of all text in an electronic document and presents to the user the layout information including all character fonts, character sizes, text colors and outline colors used in the electronic document. The user may choose any of the layout information as a query condition.

In this step, the user may determine a query condition by choosing from the layout information provided by the query system or input a query conditions manually. The query condition may be a single condition, i.e., a single attribute of text layout information, or a combined query condition, i.e., a combination of multiple attributes of text layout information. In this embodiment, the combined query condition chosen by the user is a word "intellectual property" in size 3, in the font "SimSun" and in red with green outline.

In step 201, the word "intellectual property" is queried for through character matching.

In this step, the word "intellectual property" as part of a query condition is converted into character codes of text character, and the character codes are then used as an index to query for corresponding characters in the electronic document.

In step 202, it is determined whether corresponding characters are found; if the characters are found, step 203 will be performed; otherwise step 204 will be performed.

In steps 203-206, it is determined, based on the text layout information in the query condition, whether the font of the found words "intellectual property" is "SimSun", whether the size of the found words is size 3, whether the foreground color of the found words is red and whether the outline color of the found words is green. If any of the judgments turns out negative, step 208 will be performed; if all of the judgments are positive, step 207 will be performed.

In this embodiment, the judgments on the text layout information of the words "intellectual property" are made in the following order: character font, character size, foreground color and the outline color. In practice, the order of making the judgments can be adjusted in any manner as far as all the text layout information in the query condition is applied to the document. Priorities can be assigned to the text layout information in advance to predetermine the order of applying the text layout information. Making the preceding judgments is a process of matching, and the objects are only the characters of "intellectual property" found.

In step 207, the found text of the characters "intellectual property" is record in a match list.

In this step, the text recorded in the match list includes all the layout information of the found text.

In step 208, another "intellectual property" text is queried for, step 202 is performed.

In step 210, it is determined whether the match list is empty; if the match list is empty, step 211 will be performed; otherwise step 212 will be performed.

In step 211, information indicating "no matched text is found" is returned and the process is ended.

In this step, the information indicating "no matched text is found" returned can be sent to the user as a query result.

In step 212, the matched texts found are returned as the query result and the process is ended.

In this step, the matched text found can be highlighted in the document or saved and/or exported.

The querying process of this embodiment can be summarized as follows: querying for a text matching one attribute of text layout information, determining whether the text found matches the other attributes of text layout information until it is determined that the text found matches the query condition set by the use, or until it is determined that the text found does not match another attribute of text layout information, then moving on to query for a next matched text. As the query condition set in this embodiment is comparatively precise, the query rule is comparatively simple, i.e., the query rule includes querying the document for every attribute of layout information in the query condition by matching.

It can be seen from the technical scheme of Embodiment 1 that in the querying process based on a query condition containing multiple attributes of text layout information, not only query rules for individual text layout information are needed, but also the query rules shall be combined in a way that the query rules corresponding to the attributes of text layout information are executed in a certain order. The order can be predetermined by assigning priorities to the text layout information in advance. Similarly, in querying for other objects such as graphics and images, when multiple attributes of layout information are adopted as a query condition, the order for executing query rules corresponding to the attributes of text layout information needs to be defined.

In practice, the querying process can be carried out in a very flexible manner. For example, all texts matching one attribute of text layout information can be queried for and found firstly and be saved temporarily in a match list, then it is determined whether the texts in the match list match a second attribute of text layout information and the texts that does not match the second attribute of text layout information are removed from the match list. When all the text layout information included in the query condition has gone through the matching and determining process, the texts remaining in the match list are the query result that successfully matches the query condition. The order for matching different text layout information with the texts can be predetermined by the user.

Embodiment 1 describes a process of querying for texts based on layout information, and processes of querying for graphics and images based on layout information adopt basically the same process as the process of Embodiment 1, i.e., a process of matching the layout information set by the user with the layout information of objects in the electronic document to be queried.

Embodiment 2

In an electronic document, texts, graphics and images have their own layout information as well as public layout information. The public layout information is applied to all objects in the electronic document and can be adopted individually as a query condition or be combined with text, graphic or image layout information to form a query condition. As shown in Table 1, public layout information that can be adopted as a query condition mainly contains the following types.

TABLE 1

| | Public Layout Information | |
|---|---|---|
| Object location | The display location of an image on a page, either precise location parameters or rough location description. | |
| | Rough location of an object on a page | Left of the page, right of the page, middle of the page, top of the page, bottom of the page, top left, top right, bottom left, bottom right, etc. |
| | Absolute location of an object on a page | Coordinates of the object. The top left corner of a page is usually regarded as the origin of coordinates (0, 0). |
| | The location of an object relative to a designated text on a page | Description of the direction and distance to the designated text. For example, 1 cm to the left of the designated text, or above/under the text, etc. |
| | Surrounding information of the object | For example, whether there is an image or graphic above/under/to the left of/ to the right of the object. |
| Coordinate change of the object | Coordinate information of the object, such as rotating angle, distorting degree, etc. | |

In this embodiment, the query target is graphic, and the querying is based on graphic layout information and public layout information. The differences between this embodiment and Embodiment 1 lay in that the contents of the graphic layout information are different from the text layout information. Because graphics are saved in the form of graphic drawing commands in an electronic document, a graphic drawing command of a graphic will be invoked for displaying the graphic. Therefore, attribute information for describing a graphic can be acquired from the graphic drawing command, e.g., through a line drawing command, it can be acquired that the shape of graphic is a straight line, and the coordinates of the starting point of the line, the line color and the line style can also be obtained. Hence in a querying process, a lot of attribute information of a graphic can be acquired from a graphic drawing command, and then it is determined whether the attribute information of the graphic acquired from the graphic drawing command matches graphic layout information set by the user based on a query rule to find out matched graphics.

As shown in Table 2, the graphic layout information includes the following types:

TABLE 2

| Graphic Layout Information | |
|---|---|
| Graphic shape | The displayed shape of a graphic, e.g., line, arc, circle, ellipse, rectangle, irregular shapes, etc. |
| Graphic size | Either the precise size of a graphic, e.g., the space of an enclosed shape or the length of a line, or a description of the graphic size, e.g., "very large", "large", "small", "very small", etc. |
| Graphic filling style | The way for filling the displayed graphic, including filling color, filling pattern and filling algorithm |
| | Filling color — a) the number of colors filled into the graphic shape, e.g., binary graphic, multiple colors, etc.; b) general color characteristic, e.g., determine whether the color that dominate the most space in the graphic shape matches a designated color. Usually 16 colors are available and the query system shall map the colors into appropriate color space; c) special graphic effects, such as Alpha effect, mixed effect, special color filling effect, etc. An algorithm of querying for graphics according to special color filling effects of a graphic in the query system. |
| | Filling pattern — Determine whether the graphic matches any of the common templates, such as common laces and background patterns. |
| | Filling algorithm — List major filling algorithms of graphics for users to choose as a query condition. |
| graphic outline | The style for displaying an outline of a graphic, including outline color, outline style and outline width |
| | Outline color — Precise RGB values or a rough description of the color |
| | Outline style — Dotted line, solid line or no line. |
| | Outline width — Precise line width value or a description of a relative width, e.g., the thickest line, the finest line, etc. |

Each attribute of the graphic layout information in Table 2 can be adopted individually or combined with other information as a query condition. In this embodiment, the query condition contains red vertical dotted line of a length longer than 3 cm. The "vertical" in the query conditions shall be determined based on the coordinates of the two ends of the line in the draw command, which are a part of the public layout information.

Figure 3:
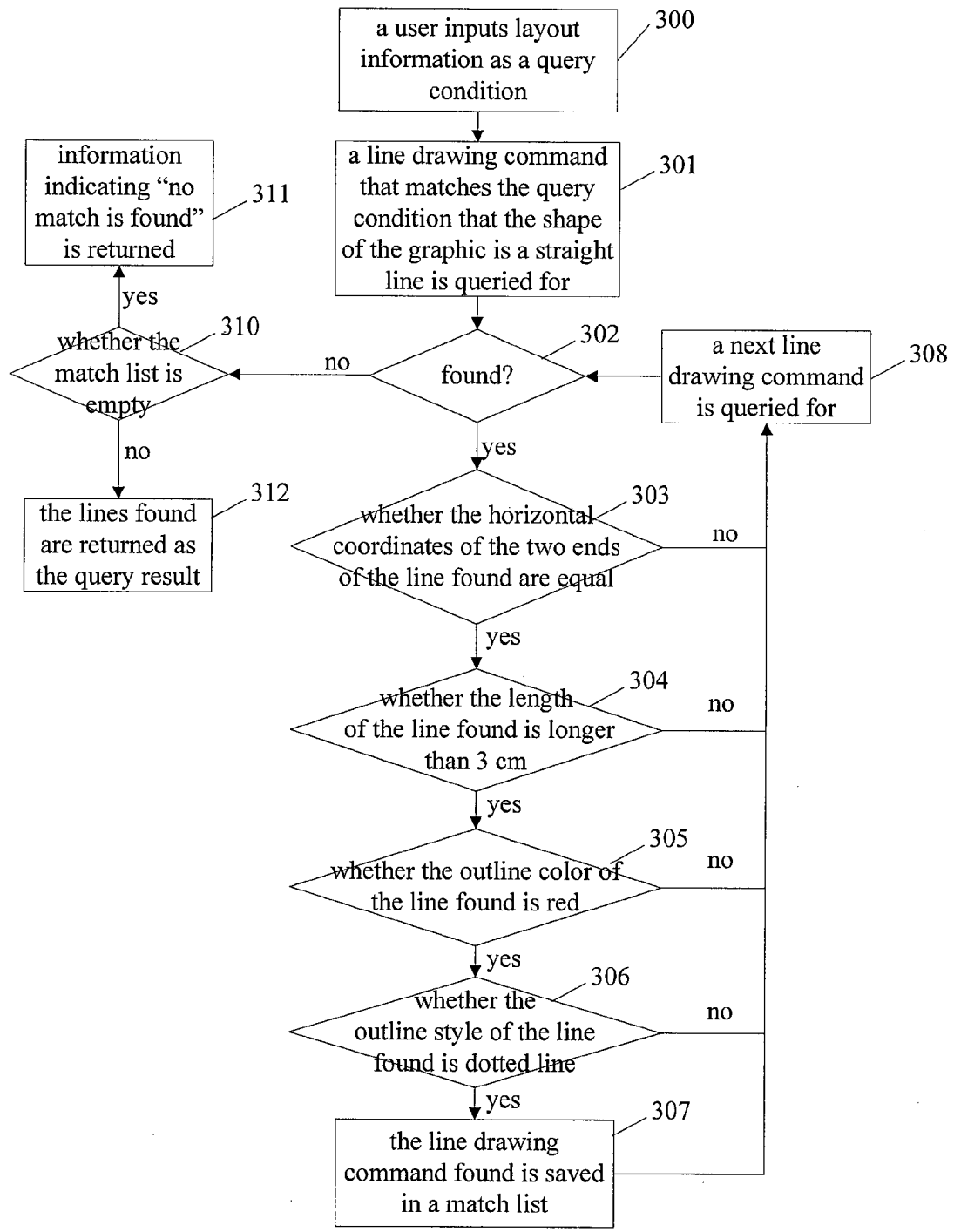
FIG. 3 is a flow chart illustrating a method for querying graphics based on layout information in accordance with Embodiment 2 of the present invention.

FIG. 3 is a flow chart illustrating a method for querying graphics based on layout information in accordance with Embodiment 2 of the present invention. As shown in FIG. 3, the method comprises the steps as follows.

In step 300, a user inputs layout information as a query condition.

In this embodiment, the layout information inputted by the user as the query condition contains: the shape of the graphic is a straight line, the size of the graphic is longer than 3 cm in length, the outline color of the graphic is red, the outline style of the graphic is dotted line and the direction of the graphic is vertical. Whether a line is vertical is determined according to whether the horizontal coordinates of the two ends of the line are equal to each other.

In step 301, in the electronic document, a line drawing command that matches the query condition that the shape of the graphic is a straight line is queried for.

In step 302, it is determined whether a line drawing command is found; if the command is found, step 303 will be performed; otherwise step 310 will be performed.

In step 303, it is determined whether the horizontal coordinates of the two ends of the found line are equal to each other based on the query condition that the direction of the line is vertical; if the horizontal coordinates of the two ends of the line are equal to each other, step 304 will be performed, otherwise step 308 will be performed.

In step 304, it is determined whether the length of the line found is longer than 3 cm based on the query condition that the length of the straight line shall be longer than 3 cm; if the length of the line is longer than 3 cm, step 305 will be performed; otherwise step 308 will be performed.

In current step 304, if the line length field is not available, the length of the line can be calculated based on the coordinates of the two ends of the line included in the line drawing command.

In step 305, it is determined whether the outline color of the line found is red based on the query condition that the outline color of the line is red; if the outline color of the line is red, step 306 will be performed; otherwise step 308 will be performed.

In step 306, it is determined whether the outline style of the line found is dotted line based on the query condition that the outline style is dotted line; if the outline style of the line is dotted line, step 307 will be performed; otherwise step 308 will be performed.

In step 307, the line found in step 306 is saved in a match list and step 308 is performed.

In step 308, a next line drawing command that matches the query condition is queried for and step 302 is performed again.

In step 310, it is determined whether the match list is empty; if the match list is empty, step 311 will be performed; otherwise step 312 will be performed.

In step 311, information indicating "no match is found" is returned and the process is terminated.

In step 312, the lines found are returned as the query result and the process is terminated.

In this embodiment, steps 301, 303, 304, 305, 306 are the query rules respectively corresponding to the shape of the graphic, direction of the graphic, size of the graphic, outline color of the graphic and the outline style of the graphic.

Embodiment 3

The querying processes in the preceding two embodiments are precise querying and this embodiment is described by taking a fuzzy method for query based on layout information as an example.

In this embodiment, the query target is image, i.e., an image query is conducted based on image layout information. The image layout information, which can be adopted as query conditions, is shown in Table 3. Each attribute of the image layout information in Table 3 can be adopted individually or combined with other information as a query condition.

As shown in Table 3, the image layout description information includes the following types:

TABLE 3

| Image Layout Information | |
|---|---|
| Image shape | The displayed shape of an image, e.g., rectangle, round, ellipse, irregular shapes, etc. |
| Image color | The primary color features of an image, including the following 3 categories: |
| | The number of colors in the image — Binary image, 16-color image, 256-color image, 24 bit color image |
| | General color characteristic of the image — the color that dominate the most space in the image, the corresponding query rule may include determining whether the designated color matches the color that dominate the most space of the image |
| | Background color of the image — the corresponding query rule may include determining whether the background color calculated through a customized algorithm matches the color designated by the user |
| Image size | Precise size of an image or a rough description of the image size, such as "largest", "large", "smallest", etc. |
| Image format | Storage format of an image |

The query condition set in this embodiment contains the largest black and white image displayed in ellipse.

Figure 4:
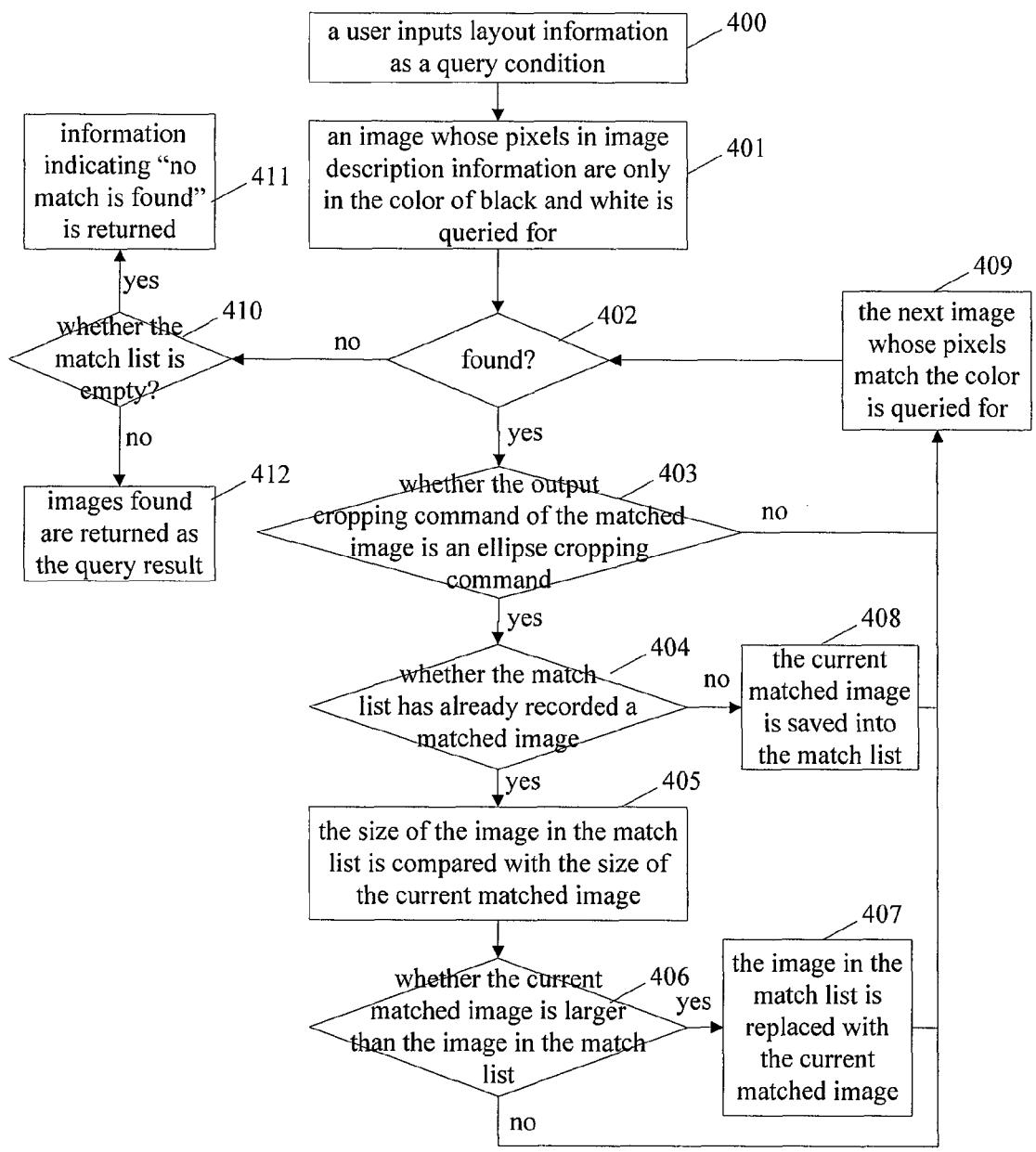
FIG. 4 is a flow chart illustrating a method for querying images based on layout information in accordance with Embodiment 3 of the present invention.

FIG. 4 is a flow chart of a method for querying images based on layout information in accordance with Embodiment 3 of the present invention. As shown in FIG. 4, the method comprises the steps as follows.

In step 400, a user inputs layout information as a query condition.

In this embodiment, the layout information inputted by the user as the query condition contains: the shape of the image is ellipse, the color of the image is black and white and the size of the image is the largest. It can be seen that the image size condition in this embodiment is a fuzzy query condition.

In step 401, an image that matches the query condition that the color of the image is black and white is queried for in an electronic document. Corresponding query rule includes querying for an image in pure black and white.

In this step, the RGB values of each pixel in an image in the electronic document are compared with the RGB values of the colors black and white, and an image containing only pixels in black and white is regarded as a matched image. Alternatively, binary images are first queried for in the electronic document, and after all binary images are found out, the colors of the image found are then determined.

If the query condition do not require the image color to be pure black and white, but largely black and white, the corresponding query rule shall be: comparing RGB values of the pixels in an image in the electronic document with the RGB values of the colors black and white, and regarding the image in which black and/or white pixels covers the most space as the matched image.

In step 402, it is determined whether a pure black and white image is found; if the image is found, step 403 will be performed; otherwise step 410 will be performed.

In step 403, it is determined whether the output cropping command of the matched image is an ellipse cropping command based on the query condition that the shape of the image is ellipse; if the cropping command is an ellipse cropping command, step 404 will be performed; otherwise step 409 will be performed.

Since images are saved in an electronic document in the shape of rectangle and are cropped when displayed so that the images can be displayed in a different shape, hence the shape of the image is obtained from the cropping command of the image.

In step 404, it is determined whether the match list has already recorded a matched image, if the match list has recorded a matched image, step 405 will be performed; otherwise step 408 will be performed.

In step 405, the size of the image in the match list is compared with the size of the current matched image.

In step 404, the match list records the largest black and white ellipse image found in the previous query and step 405 is designed to query for the largest black and white ellipse image.

In step 406, it is determined whether the current matched image is larger than the image in the match list; if the current matched image is larger than the image in the match list, step 407 will be performed; otherwise step 409 will be performed.

In step 407, the image in the match list is replaced with the current matched image and step 409 is performed.

In step 408, the current matched image is saved into the match list and step 409 is performed.

In step 409, the next black and white image is queried for and step 402 is performed again.

In step 410, it is determined whether the match list is empty; if the match list is empty, step 411 will be performed; otherwise step 412 will be performed.

In step 411, information indicating "no match is found" is returned and the process is terminated.

In step 412, at least one image found is returned as the query result and the process is terminated.

In this embodiment, steps 401 and 403 are the query rules for the color and shape of the image respectively. The fuzzy query condition is that the size of the image is the "largest", and corresponding query rule includes steps 404, 405, 406 and 407. If the query condition set by the user contains that the size of the image is "large", the query system needs to determine a definition to the word "large" in advance. Corresponding query rule can be: querying for the sizes of all images respectively, recording the largest image size found as A and the smallest image size found as B, obtaining a threshold value as the middle size by using the formula ½×(A−B)+B, and regarding an image in a size larger than the threshold value as a "large" image. Other methods or methods set by the user can also be adopted to obtain the threshold value.

Embodiment 4

In this embodiment, the query target is image and the query is carried out based on text layout information and public layout information. For example, the query target is an image located in the upper part of a page which has the words "intellectual property" to the left of the image in a distance of no longer than 2 cm, wherein the words "intellectual property" are in the color of black.

Figure 5:
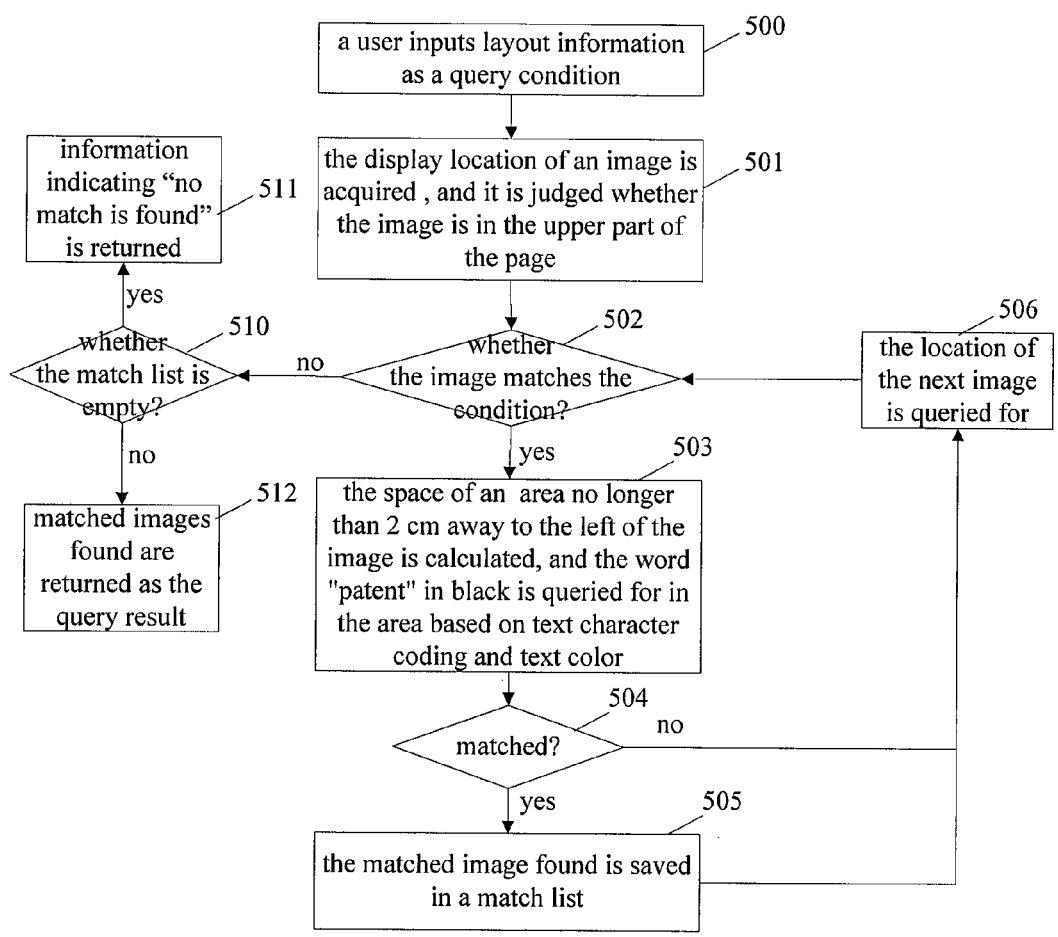
FIG. 5 is a flow chart illustrating a method for querying images based on layout information in accordance with Embodiment 4 of the present invention.

FIG. 5 is a flow chart illustrating a method for querying images based on layout information in accordance with Embodiment 4 of the present invention. As shown in FIG. 5, the method comprises the steps as follows.

In step 500, a user inputs layout information as a query condition.

In this step, the layout information inputted by the user as the query condition contains that: the general location of the image is the upper part of a page, and the location of the image relative to the designated text is that two words "intellectual property" in black is located no longer than 2 cm away to the left of the image.

In step 501, the display location of an image is acquired based on the coordinates of the image in the to-be-queried electronic document, and it is determined whether the image is in the upper part of the page based on the display location of the image and the query condition that the image is located in the upper part of the page.

In this step, it is determined that whether the coordinates of the bottom left corner and the bottom right corner of the image are both smaller than half of the length of the page. If both coordinates are smaller than half of the length of the page, the image is considered as a matched image; otherwise the image is considered as an ill-matched image. In addition, even when the both coordinates are not smaller than half of the length of the page, it can still be determined that whether more than half of the image is in the upper part of the page; if more than half of the image is in the upper part of the page, the image can be considered as a matched image, otherwise the image is regarded as an ill-matched image.

In step 502, if a matched image is found, step 503 will be performed; otherwise step 510 will be performed.

In step 503, the space of an area no longer than 2 cm away to the left of the image is determined, and the word "intellectual property" in black is queried for in the area based on text character coding and text color. The querying process is similar to the querying process based on text layout information M Embodiment 1, and the difference lies in that the area to be queried in this step is an area no longer than 2 cm away to the left of the image, and the query condition is set only on the text color and the text character.

In step 504, it is determined whether matched characters are found; if the characters are found, step 505 will be performed; otherwise step 506 will be performed.

In step 505, the matched image found in step 504 is saved in a match list and step 506 is performed.

In step 506, the location of the next image is queried for and step 502 is performed again.

In step 510, it is determined whether the match list is empty; if the match list is empty, step 511 will be performed; otherwise step 512 will be performed.

In step 511, information indicating "no match is found" is returned and the process is terminated.

In step 512, at least one matched image found is returned as the query result and the process is terminated.

In this embodiment, step 501 is the query rule corresponding to the general location of the image in the page and step 503 is the query rule corresponding to the location of the image relative to the designated text in the image.

Embodiment 5

Figure 6:
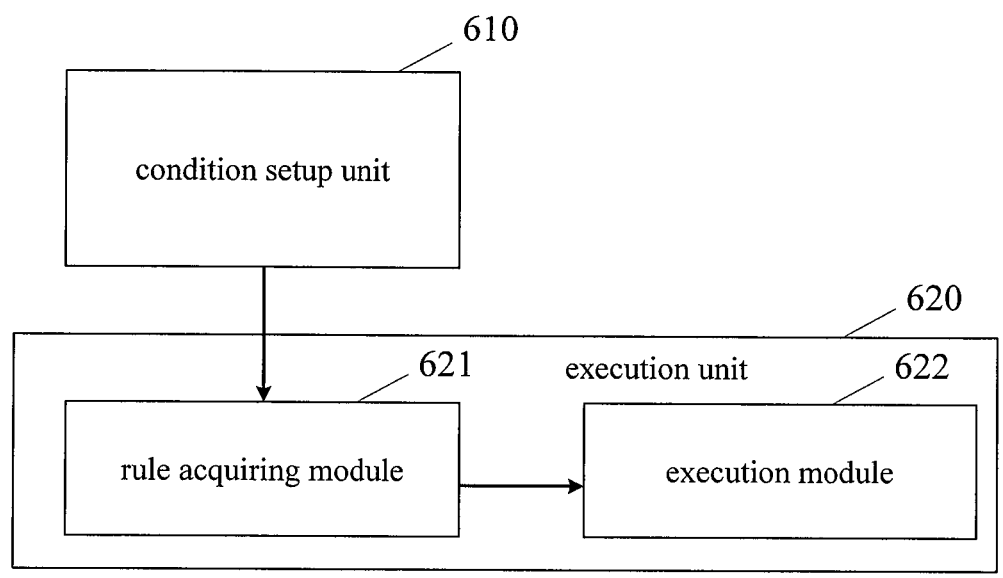
FIG. 6 is a schematic illustrating a structure of a device for query based on layout information in accordance with Embodiment 5 of the present invention.

Embodiment 5 of the present invention provides a querying device based on layout information and FIG. 6 is a schematic of a structure of the device. As shown in FIG. 6, the device includes units as follows.

Condition setup unit 610 is adapted to set up a query condition containing layout information.

Execution unit 620 is adapted to query an electronic document based on the query condition containing the layout information set by the condition setup unit 610.

The Execution unit 620 may further include modules as follows.

Rule acquiring module 621, adapted to acquire a query rule based on the query condition containing the layout information.

Execution module 622, adapted to query in the electronic document based on the query condition containing layout information and the query rule from the rule acquiring module 621.

As mentioned above, the docbase management technology provides standard interfaces through which layout information can be easily extracted from electronic documents. Therefore, according to embodiments of the present invention, the query system may obtain the layout information of all necessary objects in the electronic document through standard interfaces of a docbase management system, and establish an index according to the layout information obtained, determine whether the layout information of at least one object in the index matches the query condition every time when receiving the query condition which contains layout information. It can be understood that sometimes not all layout information of all objects in an electronic document will be obtained for establishing the index, i.e. the index can be established based on some layout information of some objects, so that the query system can be simplified and resources can be saved. Specifically, it can be determined which layout information of which objects should be obtained for establishing the index based on the needs of the user. For example, when a user only wants to query for images based on image layout information, the query system may establish the index based on image layout information only.

Alternatively, after receiving the query condition which contains layout information, the query system may obtain the layout information of at least one object in the electronic document through standard interfaces of a docbase management system and determine whether the layout information of the at least one object matches the query condition, if layout information of the object matches the query condition, return the object as the query result, and then obtain layout information of another at least one object and performs the determining.

By adopting the docbase technique, an electronic document of any format can be converted into a document which has the same layout and whose format is supported by the docbase management system. Therefore, the query system is able to obtain layout information in an electronic document of any format through standard interfaces of the docbase management system, thus it is possible to query based on layout information in electronic documents of any formats.

In an embodiment, if the query system is able to parse the electronic document directly, the query system can obtain the layout information of at least one object directly without the docbase management system. In this embodiment, the query system has to parse the electronic document by itself, thus the query system only supports query in electronic documents that the query system can parse.

Accordingly, the execution unit 620 of embodiments of the present invention may be adapted to obtain the layout information of all necessary objects in the electronic document through standard interfaces of a docbase management system and determine whether the layout information of at least one object matches the query condition, or be adapted to obtain layout information of at least one object in the electronic document through standard interfaces of a docbase management system after receiving the query condition containing layout information and determine whether the layout information of the object matches the query condition.

It should be noted that, in Chinese language, singular form and plural form of a noun are the same word, thus the nouns, e.g., "electronic document", "query condition", in the above description adopt singular form of the nouns just for facilitating translating and describing, but in fact they can be either singular or plural.

It can be seen from the preceding technical schemes that schemes for query based on the layout information provided by the present invention provides a comprehensive, highly efficient and accurate electronic document query approach. The querying is more specific and the query results are more accurate, thus the query efficiency is improved. In addition, the present invention allows querying for specific graphics and images based on layout information inputted by a user and hence widens the range of queryable objects.

The embodiments of the present invention show the basic principles of query based on layout information and those skilled in the art can easily re-arrange the basic principles of query revealed by the embodiments of the present invention into more complicated and improved query principles and such improvement shall be covered by the protection scope of the present invention.

The foregoing descriptions are only preferred embodiments of this invention and are not for use in limiting the protection scope thereof. Any modification, equivalent replacement and improvement made without departing from the principle of the present invention should be included in the protection scope thereof.

The invention claimed is:

1. A method for query based on layout information, comprising:

setting up a query condition which is a visible attribute specified by a user, wherein the visible attribute is one of character font, character size, character color, character filling style, character outline style, special effect of character, graphic shape, graphic size, graphic filling style and graphic outline style, image shape, image size, image color and image format, object position and object coordinate conversion;

obtaining layout information of an electronic document in a computer readable storage medium, wherein the layout information of the electronic document includes description of visible attributes of one or more objects in the electronic document, wherein each of the objects is one of a text, a graphics, and an image; and querying the electronic document for the object having the visible attribute that matches the description in the query condition specified by the user based on the layout information obtained;

wherein, obtaining layout information of the electronic document and querying in the electronic document for an object which is one of a text or a graphic or an image having the visible attribute comprise:

obtaining the layout information of all required objects in the electronic document;

establishing an index according to the layout information obtained, and determining whether the at least one object has the visible attribute by utilizing the index.

2. The method according to claim 1, wherein setting up the query condition comprises:

adopting a description of characteristics of at least one of text layout information, graphic layout information, image layout information and public layout information as the query condition; and wherein obtaining layout information in an electronic document through standard interfaces of a docbase management system comprises:

obtaining a description of characteristics of at least one of text layout information, graphic layout information, image layout information and public layout information through standard interfaces of the docbase management system.

3. The method according to claim 1, wherein setting up the query condition comprises:

inputting the visible attribute by a user; or selecting at least one visible attribute by the user from layout information provided by a query system as the query condition.

4. The method according to any of claim 1, wherein the electronic document conforms to a docbase standard.

5. The method according to claim 4, wherein the docbase standard is Unstructured Operation Markup Language standard.

6. The method according to claim 1, wherein obtaining layout information of the electronic document and querying in the electronic document for an object which is one of a text or a graphic or an image having the visible attribute comprise:

enumerating each object in the electronic document;

determining whether the layout information of the object has the visible attribute.

7. The method according to claim 1, wherein obtaining layout information of an electronic document in a computer readable storage medium comprises:

obtaining layout information in an electronic document through standard interfaces of a docbase management system after the electronic document is converted into a document whose format is supported by the docbase management system.

8. A device for query based on layout information, comprising:

a condition setup unit, adapted to set up a query condition which is a visible attribute specified by a user, wherein the visible attribute is one of character font, character size, character color, character filling style, character outline style, special effect of character, graphic shape, graphic size, graphic filling style and graphic outline style, image shape, image size, image color and image format, object position and object coordinate conversion; and an execution unit, adapted to obtain layout information of an electronic document in a computer readable storage medium; and query the electronic document for the object having the visible attribute that matches the description in the query condition specified by the user based on the layout information obtained, wherein the layout information of the electronic document includes description of visible attributes of one or more objects in the electronic document, wherein each of the objects is one of a text, a graphics, and an image; wherein, obtaining layout information of the electronic document and querying in the electronic document for an object which is one of a text or a graphic or an image having the visible attribute comprise:

obtaining the layout information of all required objects in the electronic document; establishing an index according to the layout information obtained, and determining whether the at least one object has the visible attribute by utilizing the index.

9. The device according to claim 8, wherein the execution unit comprises:

a rule acquiring module, adapted to acquire a query rule based on the query condition and a pre-set relation between the query condition and the query rule; and an execution module, adapted to query the electronic document based on the query condition and the query rule from the rule acquiring module.

10. The device according to claim 8, wherein the execution unit is adapted to enumerating each object in the electronic document and determining whether the object has the visible attribute.

11. The device according to claim 8, wherein the execution unit is adapted to obtain the layout information of all objects in the electronic document through standard interfaces of a docbase management system and determine whether the at least object has the visible attribute.

12. The device according to claim 8, wherein the execution unit is adapted to obtain layout information of at least one object in the electronic document through standard interfaces of a docbase management system after the query condition is set up by the condition setup unit, and determine whether the at least one object has the visible attribute.

13. The method according to claim 2, wherein obtaining layout information of an electronic document comprises at least one of:

obtaining at least one of character size, font, color, filling style, outline style and special effects of text from the text layout information, obtaining at least one of shape, size, filling color, filling pattern, filling algorithm, outline color, outline style, outline width of a graphic from a drawing command of the graphic, obtaining a location or coordinates of a graphic or an image from the public layout information, and obtaining a shape of an image from a cropping command of the image.

14. The device according to claim 8, wherein the execution unit is adapted to perform at least one of:

obtaining at least one of character size, font, color, filling style, outline style and special effects of text from the text layout information, obtaining at least one of shape, size, filling color, filling pattern, filling algorithm, outline color, outline style, outline width of a graphic from a drawing command of the graphic, obtaining a location or coordinates of a graphic or an image from the public layout information, and obtaining a shape of an image from a cropping command of the image.

* * * * *